United States Patent [19]
Yuzuriha et al.

[11] Patent Number: 5,676,107
[45] Date of Patent: Oct. 14, 1997

[54] DIRECT INJECTION DIESEL ENGINE

[75] Inventors: Yasuhiro Yuzuriha; Shunji Masuda; Masaaki Kashimoto; Manabu Shibakawa, all of Hiroshima-ken, Japan

[73] Assignee: Mazda Motor Corporation, Hiroshima, Japan

[21] Appl. No.: 423,947

[22] Filed: Apr. 19, 1995

[51] Int. Cl.$^6$ ...................................................... F02B 31/00
[52] U.S. Cl. .................................... 123/302; 123/308
[58] Field of Search ........................ 123/301, 302, 123/305, 308

[56] References Cited

U.S. PATENT DOCUMENTS 3,824,971  7/1974  Skatsche et al. ................... 123/302

FOREIGN PATENT DOCUMENTS

62-144     1/1987   Japan .
63-156424  10/1988  Japan .

*Primary Examiner*—Tony M. Argenbright

[57] ABSTRACT

A direct injection diesel engine includes a cylinder head which is formed, for each cylinder, with a plurality of intake ports. At least one of the intake ports has an approximately straight throat extending tangentially to the cylinder and opening into a combustion chamber at upper reaches of swirling. Another of the intake ports has a throat opening into the combustion chamber at lower reaches of swirling. A glow plug extends downward from one side of the cylinder head, at which the intake ports open, toward a location between the other intake port. An exhaust port extends from another side of the cylinder head and opens into the combustion chamber.

15 Claims, 5 Drawing Sheets

DIRECT INJECTION DIESEL ENGINE

BACKGROUND OF THE INVENTION

1. Field of the Invention

The present invention relates to a diesel engine and, more particularly, to a direct injection type of diesel engine which has a plurality of intake ports extending from one side of a cylinder head and opening into a combustion chamber, at least one exhaust port extending from another side of the cylinder head and opening into the combustion chamber, and a glow plug extending toward a recessed piston head.

2. Description of Related Art

In order to increase a volumetric efficiency of diesel engines, it is typical to form two intake ports in each of the diesel engine cylinders. These intake ports are laid out so as to produce, respectively, unidirectional swirling for the purpose of improving combustibility. In this type of diesel engine, two intake ports for each cylinder are usually configured so that one of the ports has a helical throat (such a port is hereafter referred to as a helical intake port) and the other has a straight throat parallel to a tangent to the cylinder (such a port is hereafter referred to as a straight tangential intake port). While the helical intake port is helpful in increasing a swirling ratio of a fuel mixture, however, it produces a decline in volumetric efficiency due to its large intake air resistance. Recently, by virtue of improvements in fuel injection systems, the fuel combustibility provided by this type of diesel engine is ensured even if a low swirling ratio is present. Consequently, there is a strong tendency to try to combine a high volumetric efficiency together with a low swirling ratio.

Various efforts have been made to define the configuration of intake ports in order to produce a diesel engine having a high volumetric efficiency. One such effort is described in Japanese Unexamined Utility Model Publication No. 62-144. The approach described in this publication is to form two straight tangential intake ports for each cylinder so as to produce a desired swirling ratio. These two intake ports are laid out such that an opening of one of the two intake ports, located behind a location at which swirling is produced, is in closer proximity to a horizontal center line of the cylinder perpendicular to a plane including a vertical axis of the cylinder than an opening of the other of the intake ports. A center line passing through centers of the two openings extends at a certain angle relative to the horizontal center line. The cylinder is also formed with two exhaust ports arranged in what is called a staggered fashion. In such an arrangement, a center line of two openings of the exhaust ports is parallel to the center line of the two openings of the intake ports.

Japanese Unexamined Utility Model Publication No. 63-156424 discloses a gasoline engine provided with a main port for introducing air only and a supplementary port for introducing an air-fuel mixture. Both of these ports are of a straight type producing unidirectional swirling. These main and supplementary ports are laid out such that a glow plug extends toward a position between the main port and an exhaust port from one side of a cylinder head remote from the main port.

A concavity or recess may be provided in a piston crown or head. Such a concavity or recess forms a single combustion chamber for each cylinder together with a lower wall of the cylinder head of a direct injection type of diesel engine. Two intake valves for each cylinder or, more specifically, two intake valves and two exhaust valves for each cylinder deliver fuel directly into the combustion chamber and thereby improve starting performance of the engine. In an attempt to mount a glow plug in the concavity or recess, the selection of helical and/or tangential shapes of the two intake ports and the location of the glow plug relative to the intake and exhaust ports is a matter of great concern. This is particularly true with respect to considerations such as the degree of freedom in laying out the glow plug relative to the intake and exhaust ports, the intensity of swirling, thermal damage to the glow plug and the like.

In the design of, for instance, a four valve, direct injection diesel engine, one approach to glow plug layouts is to direct the glow plug vertically toward the notch in the piston head. However, since such a vertical arrangement must make use of a long glow plug extending above the cylinder head without any positional interference with a valve drive system above the cylinder head, it is structurally impractical.

Another approach is to direct the glow plug obliquely from the flank of the cylinder head. In this oblique arrangement, the glow plug may extend from the cylinder flank remote from one of the intake ports or, otherwise, from the cylinder flank near the intake port. In any oblique arrangement, at least one of the intake ports, namely a rear intake port, is ordinarily required to have a helical nose. As a result, various constraints are imposed upon oblique arrangements. These constraints will be described hereafter with reference to FIGS. 1–4.

Figure 1:
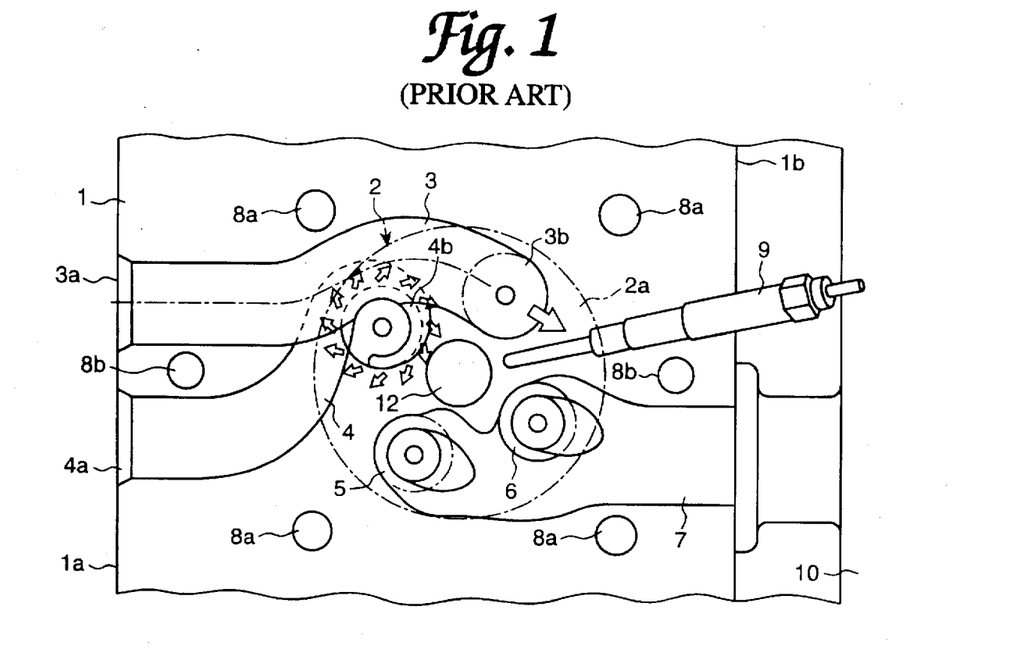
FIG. 1, as noted above, is a schematic illustration showing an example of a cylinder head of a prior art direct injection diesel engine.

FIG. 1 shows schematically a prior art arrangement in which a glow plug 9 extends obliquely toward the center of a combustion chamber 2a from the flank of a cylinder head 1 remote from intake ports of each cylinder 2. One of these intake ports, namely a front intake port 3, is approximately straight and tangential to a chamber wall, and the other, namely a rear intake port 4, is helical. The front intake port 3 has an upstream end 3a at one of the flanks 1a of the cylinder head 1 and a downstream end 3b opening into the combustion chamber 2a. Similarly, the rear intake port 4 has an upstream end 4a at the flank 1a of the cylinder head 1 and a downstream end 4b opening into the combustion chamber 2a. Further, the cylinder head 1 has two exhaust ports, namely a front exhaust port 5 and a rear exhaust port 6, for each cylinder. These front and rear exhaust ports open into the combustion chamber 2a and join together as a single exhaust port 7 extending to another flank 1b of the cylinder head 1 and opening into an exhaust manifold 10. A fuel injector 12 is located approximately at a center of the combustion chamber 2a. The glow plug 9 extends obliquely from the flank 1b of the cylinder head 1 where the exhaust port 7 opens. The cylinder head 1 is formed with several bosses, such as main bolt bosses 8a and extra bolt bosses 8b, distributed as shown in FIG. 1.

In this "oblique" arrangement, since the glow plug 9 is in close proximity to the exhaust manifold 10 and interferes with an intake air flow introduced through the front intake port 3, the arrangement suffers from high heat production and has an influence on swirling.

Figure 2:
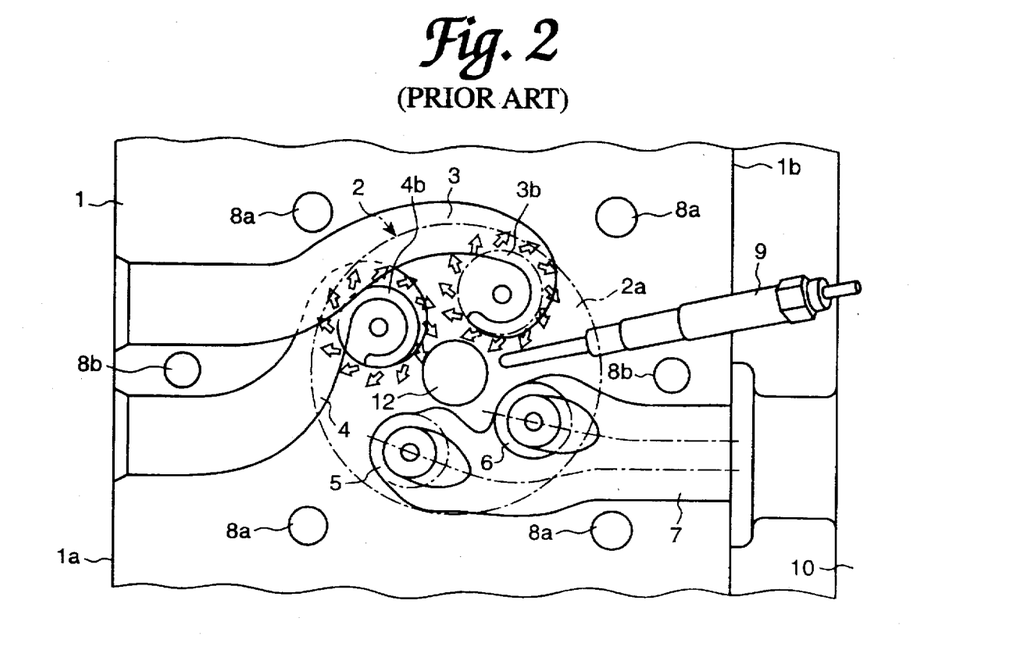
FIG. 2, as noted above, is a schematic illustration showing an example of a cylinder head of another prior art direct injection diesel engine.

FIG. 2 shows schematically another prior art arrangement in which a glow plug 9 extends obliquely toward the center of a combustion chamber 2a from the flank of a cylinder head 1 remote from front and rear intake ports of each cylinder 2, both of which are helical. The front intake port 3 has an upstream end 3a at one of the flanks 1a of the cylinder head 1 and a downstream end 3b opening into the combustion chamber 2a. Similarly, the rear intake port 4 has an upstream end 4a at the flank 1a of the cylinder head 1 and a downstream end 4b opening into the combustion chamber 2a. Further, the cylinder head 1 has two exhaust ports, namely a front exhaust port 5 and a rear exhaust port 6, for each cylinder. These front and rear exhaust ports open into the combustion chamber 2a and join together as a single exhaust port 7 extending to another flank 1b of the cylinder head 1 and opening into an exhaust manifold 10. A fuel injector 12 is located approximately at a center of the combustion chamber 2a, and a glow plug 9 extends obliquely toward the combustion chamber 2a from the flank 1b of the cylinder head 1 at which the exhaust port 7 opens. The cylinder head 1 is formed with several bosses, such as main bolt bosses 8a and extra bolt bosses 8b, distributed as shown in FIG. 2.

In this oblique arrangement, since the glow plug 9 is in close proximity to the exhaust manifold 10 and interferes with an intake air flow introduced through the front intake port 3, it suffers heat damage and produces an adverse influence on a part of the swirling air or gas flow.

Figure 3:
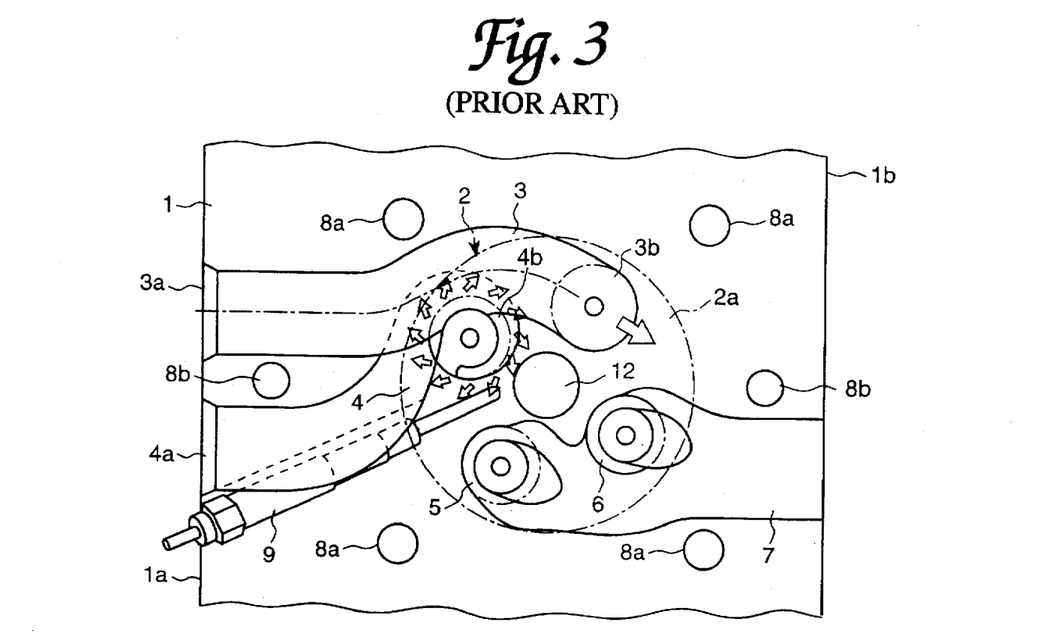
FIG. 3, as noted above, is a schematic illustration showing an example of a cylinder head of still another prior art direct injection diesel engine.

FIG. 3 shows schematically another prior art arrangement in which a glow plug 9 extends obliquely toward the center of a combustion chamber 2a from a flank of a cylinder head 1 near intake ports of each cylinder 2. One of these intake ports, namely a front intake port 3, is straight and tangential, and the other, namely a rear intake port 4, is helical. The front intake port 3 has an upstream end 3a at one of the flanks 1a of the cylinder head 1 and a downstream end 3b opening into the combustion chamber 2a. Similarly, the rear intake port 4 has an upstream end 4a at the flank 1a of the cylinder head 1 and a downstream end 4b opening into the combustion chamber 2a. Further, the cylinder head 1 has two exhaust ports, namely a front exhaust port 5 and a rear exhaust port 6, for each cylinder. These front and rear exhaust ports open into combustion chamber 2a and join together as a single exhaust port 7 extending to another flank 1b of the cylinder head 1 and opening into an exhaust manifold 10. A fuel injector 12 is located approximately at a center of the combustion chamber 2a. The glow plug 9 extends obliquely from the flank 1a of the cylinder head 1 where the intake ports 3 and 4 open.

In this oblique arrangement, the rear helical intake port 4 has the advantage of avoiding positional interference of intake air flows, introduced into the combustion chamber 2a through the front and rear intake ports 3 and 4, with each other. Nevertheless, the arrangement is ordinarily large in vertical height, so that the degree of freedom of a glow plug layout is usually low due to possible positional interference between the rear intake port 4 and the glow plug 9. Further, the glow plug 9 has an influence partly on an intake air flow introduced through the rear intake port 4a at a uniform rate around the entire opening 4b.

Figure 4:
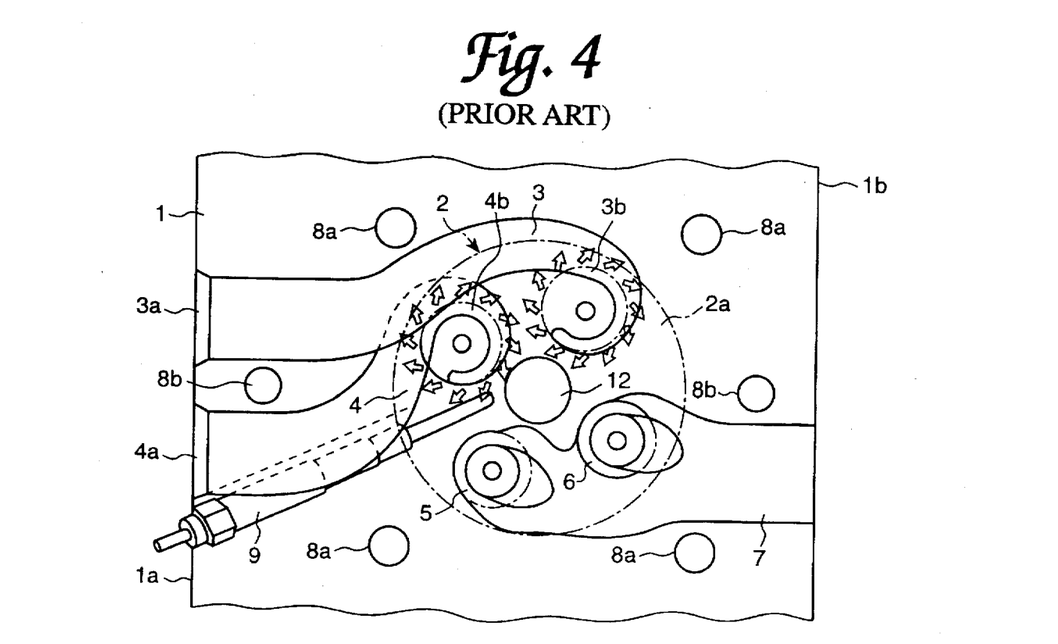
FIG. 4, as noted above, is a schematic illustration showing an example of a cylinder head of another prior art direct injection diesel engine.
Figure 5:
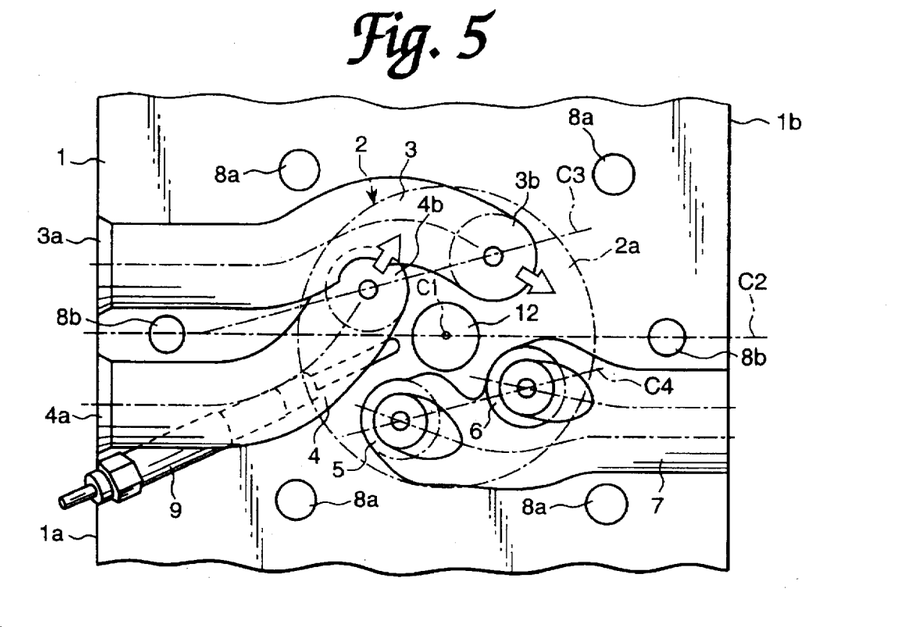
FIG. 5 is a schematic illustration showing a cylinder head of a direct injection diesel engine in accordance with a preferred embodiment of the present invention as viewed from the top.
Figure 6:
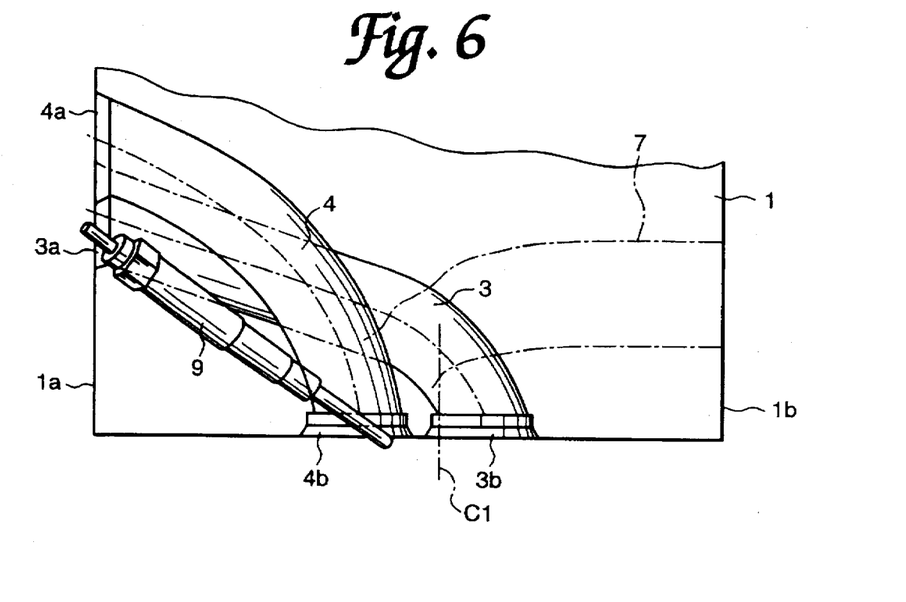
FIG. 6 is a schematic illustration showing the cylinder head of FIG. 5 as viewed from the front.

FIG. 4 shows schematically still another prior art arrangement in which a glow plug 9 extends obliquely toward the center of a combustion chamber 2a from the flank of a cylinder head 1 remote from front and rear intake ports of each cylinder 2, both of which are helical. The front intake port 3 has an upstream end 3a at one of the flanks 1a of the cylinder head 1 and a downstream end 3b opening into the combustion chamber 2a. Similarly, the rear intake port 4 has an upstream end 4a at the flank 1a of the cylinder head 1 and a downstream end 4b opening into the combustion chamber 2a. In addition, the cylinder head 1 has two exhaust ports, namely a front exhaust port 5 and a rear exhaust port 6, for each cylinder. These front and rear exhaust ports open into combustion chamber 2a and join together as a single exhaust port 7 extending to another flank 1b of the cylinder head 1 and opening into an exhaust manifold 10. A fuel injector 12 is located approximately at a center of the combustion chamber 2a, and a glow plug 9 extends obliquely toward the combustion chamber 2a from the flank 1b of the cylinder head 1 at which the exhaust port 7 opens. The cylinder head 1 is formed with several bosses such as main bolt bosses 8a and extra bolt bosses 8b.

This arrangement causes a reduction in the degree of freedom of laying out a glow plug due to possible positional interference between the rear intake port 4 and the glow plug 9. The glow plug 9 is also rendered influential in providing a uniform intake air flow around the entire opening 4b of the rear intake port 4a as well.

Installing a glow plug in a direct injection, double tangential, type of diesel engine, having two straight and tangential intake ports for each cylinder, has been considered. In such an arrangement, the glow plug has a different influence on the degree of freedom in glow plug layout, the strength of swirling, heat damage and the like. One such arrangement takes advantage of a layout of an ignition plug; such an arrangement is described in Japanese Unexamined Utility Model Publication No. 63-156424. If a glow plug is installed so as to extend obliquely into a combustion chamber from the exhaust side of a double tangential, direct injection, type of diesel engine, then the glow plug will be in close proximity to an exhaust manifold and, consequently, will experience the same influence of heat as the glow plug of a direct injection diesel engine of the type having a front tangential intake port and a rear helical intake port. In addition, it is apparent that the glow plug of the double tangential, direct injection, type of diesel engine also will have an influence on an air flow introduced through the front tangential intake port. It was thought that a glow plug may be laid out otherwise so as to extend obliquely into the combustion chamber from the intake side of the double tangential, direct injection, diesel engine. Such an arrangement, however, includes various unsolved problems and, accordingly, is not clearly practical.

SUMMARY OF THE INVENTION

It is an object of the present invention to provide a direct injection diesel engine having a plurality of intake ports which provides a compact a glow plug arrangement.

It is another object of the invention to provide a direct injection diesel engine having a plurality of intake ports which secures the degree of freedom in glow plug layout without causing a glow plug to either suffer heat damage or have an adverse influence on swirling.

Much attention has been given to various arrangements of glow plugs relative to intake ports and, as a result, it was proved that an expedient arrangement includes at least a rear intake port of a cylinder head formed in a tangential fashion and a glow plug installed into the cylinder head from a side of the cylinder head at which intake ports open. While this arrangement still imposes a restraint on an angle at which the rear intake port opens into a combustion chamber, it yields high degrees of freedom in laying out the glow plug. Owing to this arrangement, the glow plug can be easily and suitably situated without having any influence on a flow of intake air introduced through any intake port. Consequently, the arrangement is prevented from suffering heat damage and being elongated.

A direct injection type of diesel engine has a cylinder head which is formed, for each cylinder, with a plurality of intake ports. The intake ports extend downward from one side of the cylinder head and open into a combustion chamber on one side of a transverse center line of the cylinder so as to spatially intersect, perpendicularly, a center line of rotation of a crankshaft. At least one exhaust port extends from another side of the cylinder head and opens into the combustion chamber on another side of the transverse center line. Each cylinder is provided with a glow plug directed toward a concavity formed in a piston head. At least one front intake port is formed so as to have an approximately straight throat which extends in a plane perpendicular to a vertical center line of the cylinder and parallel to a tangent to the cylinder. The front intake port opens into the combustion chamber at upper reaches of swirling produced in the combustion chamber. At least one rear intake port is formed so as to have a throat which opens into the combustion chamber at lower reaches of swirling. The glow plug is installed so as to extend downward from the one side of the cylinder head toward a location between the rear intake port and the exhaust port. One end of the rear intake port, at which the rear intake port opens into the combustion chamber, is desirably located closer in proximity to the transverse center line than one end of the front intake port at which the front intake port opens into the combustion chamber.

According to a preferred embodiment of the invention, the glow plug is located so as to extend below and overlap, in position, at least partly with the rear intake port. Another end of the rear intake port is located higher, in vertical position, than another end of the front intake port. In this instance, the glow plug can be installed in what is called a "dead space" provided below an upstream part of the rear intake port.

According to another embodiment of the invention, the direct injection diesel engine is of a double tangential type that has front and rear intake ports. Each of the front and rear intake ports has an approximately straight throat extending in a plane perpendicular to the vertical center line of the cylinder and parallel to a tangent to the cylinder. The glow plug is located so as to extend below and overlap, in position, at least partly with the rear intake port. Another end of the rear intake port is located higher, in vertical position, than another end of the front intake port. In this instance, the glow plug can be installed in a dead space provided below an upstream part of the rear intake port. Further, the other end of the rear intake port is desirably located so as to have an ejection angle, at which an air-fuel mixture is ejected into the combustion chamber, which is larger than that of the front intake port.

With a direct injection diesel engine according to the invention, the glow plug is laid out with a high degree of freedom so that it can be located a long distance from the exhaust port and free from positional interference with the intake ports. Consequently, intake air, introduced into the combustion chamber through the intake ports, is prevented from interference with the glow plug and is helpful in producing a certain swirling. Also, the glow plug is kept free from heat damage due to exhaust gases and has no adverse influence on a flow of coolant in a water jacket at the side of the cylinder head at which the exhaust port opens. Because the rear intake port has a straight and tangential throat, the rear intake port imposes, on the glow plug, a lower positional restraint necessary to avoid interference therebetween than a helical type of rear intake ports. The rear intake port also helps to increase the volumetric efficiency of the diesel engine and produce a certain swirling. Furthermore, directing the front and rear intake ports so that the rear intake port ejects an air-fuel mixture into the combustion chamber at an angle larger than the front intake port forces a main stream of intake air from the rear intake port to be directed downward as compared to a main stream of intake air from the rear intake port. This also permits a rear intake valve to operate with a decreased moment of axial inertia so that swirling is spread out or dissipated less when passing the rear intake valve. This results in lower interference between intake air flows introduced through the front and rear intake ports and lessens interference between an intake air flow from the rear intake port and a front intake valve. An enhanced swirling and an increase in volumetric efficiency are provided.

BRIEF DESCRIPTION OF THE DRAWINGS

The above and other objects and features of the present invention will be clearly understood from the following description of a preferred embodiment thereof when considered in conjunction with the accompanying drawings. In the drawings, the same reference numerals have been used to denote the same or similar parts or elements throughout.

DESCRIPTION OF THE PREFERRED EMBODIMENTS

Referring now to the drawings in detail and, in particular, to FIGS. 5–8, a cylinder head 1 of, for instance, an in-line, multi-cylinder, type of direct injection diesel engine has a plurality of cylinder bores 2 (only one of which is shown). Each cylinder head 1 is formed with a combustion chamber 2a between a piston head (not shown) and a lower wall of the cylinder head 1. The cylinder head 1 has two intake ports, namely, a front intake port 3 and a rear intake port 4, both of which are of a straight and tangential type. The front intake port 3 has an upstream end 3a at one of the flanks 1a of the cylinder head 1 and a downstream end 3b opening into the combustion chamber 2a at an upper part of a swirling gas or air stream. Similarly, the rear intake port 4 has an upstream end 4a at the flank 1a of the cylinder head 1 and a downstream end 4b opening into the combustion chamber 2a at lower reaches of the swirling gas or air stream. Further, the cylinder head 1 has two exhaust ports, namely a front exhaust port 5 and a rear exhaust port 6, for each cylinder. These front and rear exhaust ports 5 and 6 open into combustion chamber 2a and join together as a single exhaust port 7 extending to another flank 1b of the cylinder head 1. A fuel injector 12 is located approximately at a center of the combustion chamber 2a. A glow plug 9 is inserted into the cylinder head 1 through a bore 11 (see FIGS. 7 and 8) extending below the rear intake port 4 and obliquely downward from the flank 1a of the cylinder head 1, at which the intake ports 3 and 4 open, toward a location at which the downstream end 4a of the rear intake port 4 terminates and opens into the combustion chamber 2a. This glow plug 9 is positioned so as to direct its tip end toward a notch of the piston head. The cylinder head 1 is formed with a number of bosses for bolt holes. These bosses include main bolt bosses 8a in two rows on both sides of a row of cylinder bores 2 and extra bolt bosses 8b in two rows on both sides of the cylinder bore. In other words, four main bolt bosses 8a are arranged around each cylinder bore 2 at regular angular separations and at an equal distance from the center of the cylinder bore 2 so that each pair of main bolt bosses 8a is aligned in the transverse direction of the cylinder head 1 between one pair of adjacent cylinder bores 2. Each extra bolt boss 8b is offset outside from the main bolt bosses 8a in the transverse direction and positioned between each pair of main bolt bosses 8a in the lengthwise direction. Further, each pair of extra bolt bosses 8b is on a transverse center line C2 of the cylinder bore 2 and at an equal distance from the adjacent main bolt bosses 8a.

As is described above, the front and rear intake ports 3 and 4 are of the straight tangential type having a straight throat extending parallel to a line tangential to the cylinder bore 2 in a plane perpendicular to a vertical center line C1 of the cylinder bore 2. The intake ports 3 and 4 are arranged in what is called a "staggered" fashion so that a center line C4 of two openings of the exhaust ports is basically parallel to the center line C3 of the two openings of the intake ports. That is, these front and rear intake ports 3 and 4 are arranged so that the downstream end 4b of the rear intake port 4 is located closer in proximity to the transverse center line C2 of the cylinder bore 2, which spatially intersects a center line of rotation of a crankshaft (not shown) of the engine at a right angle, than to the downstream end 3b of the front intake port 3. Also, the center line C3, passing through centers of the respective downstream ends 3b and 4b of the front and rear intake ports 3 and 4, intersects the transverse center line C2 at a certain angle. Further, the front and rear intake ports 3 and 4 are arranged such that the upstream end 4a of the rear intake port 4 is located higher in the vertical direction than the upstream end 3a of the front intake port 3. In addition, the rear intake port 4 has an ejection angle, at which it ejects air into the combustion chamber 2a, which is larger than that of the front intake port 3. The rear intake port 4 may, if desired, have an ejection angle which is smaller than or, otherwise, equal to that of the front intake port 3.

The exhaust ports 5 and 6, by contrast, are arranged such that the center line C4, passing through the centers of the respective upstream ends of the front and rear exhaust ports 5 and 6, is approximately parallel to the center line C3 passing through the centers of the respective downstream ends 3b and 4b of the front and rear intake ports 3 and 4.

Figure 7:
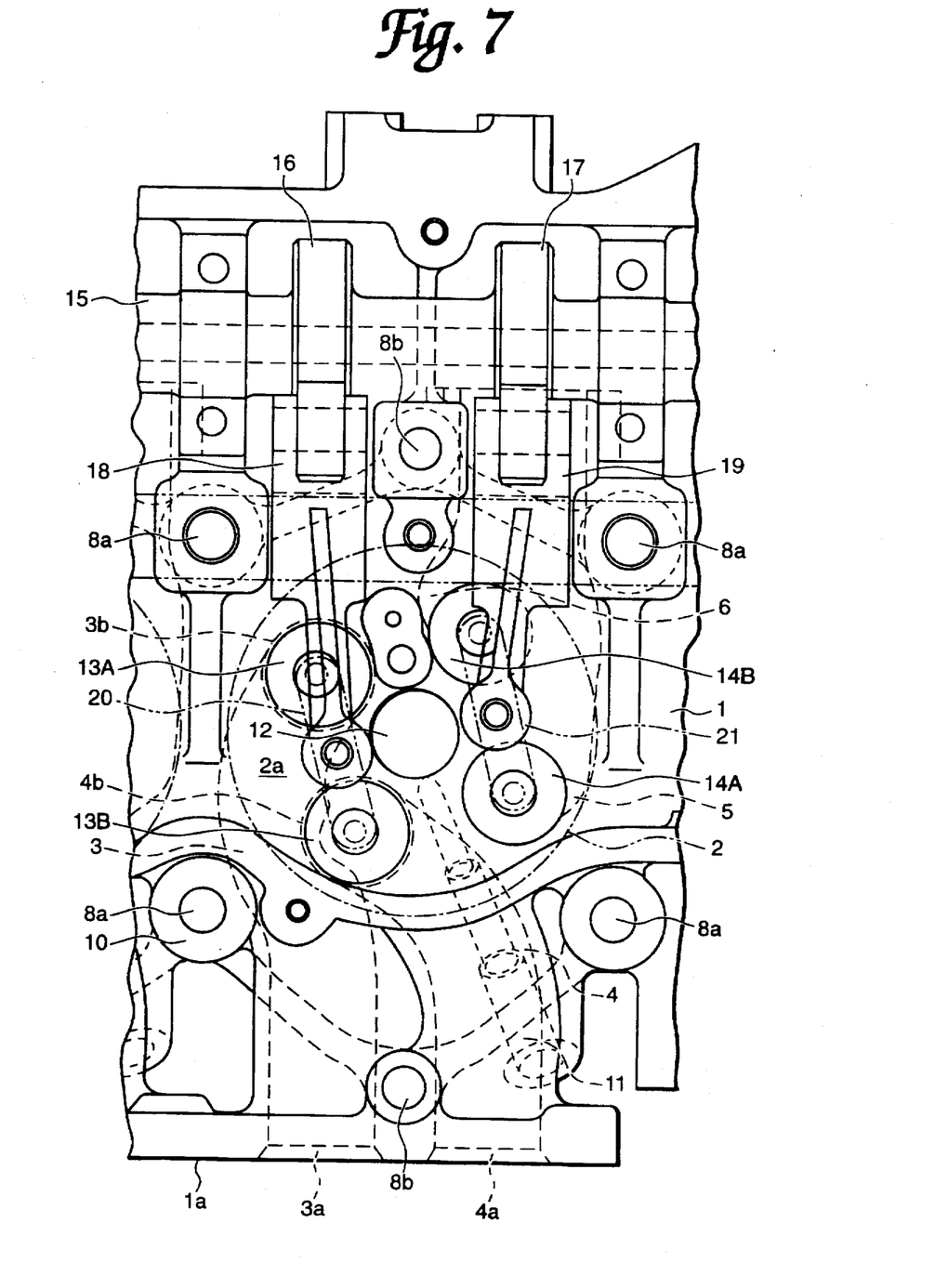
FIG. 7 is a plan view of a part of the cylinder head of the direct injection diesel engine of FIG. 5.
Figure 8:
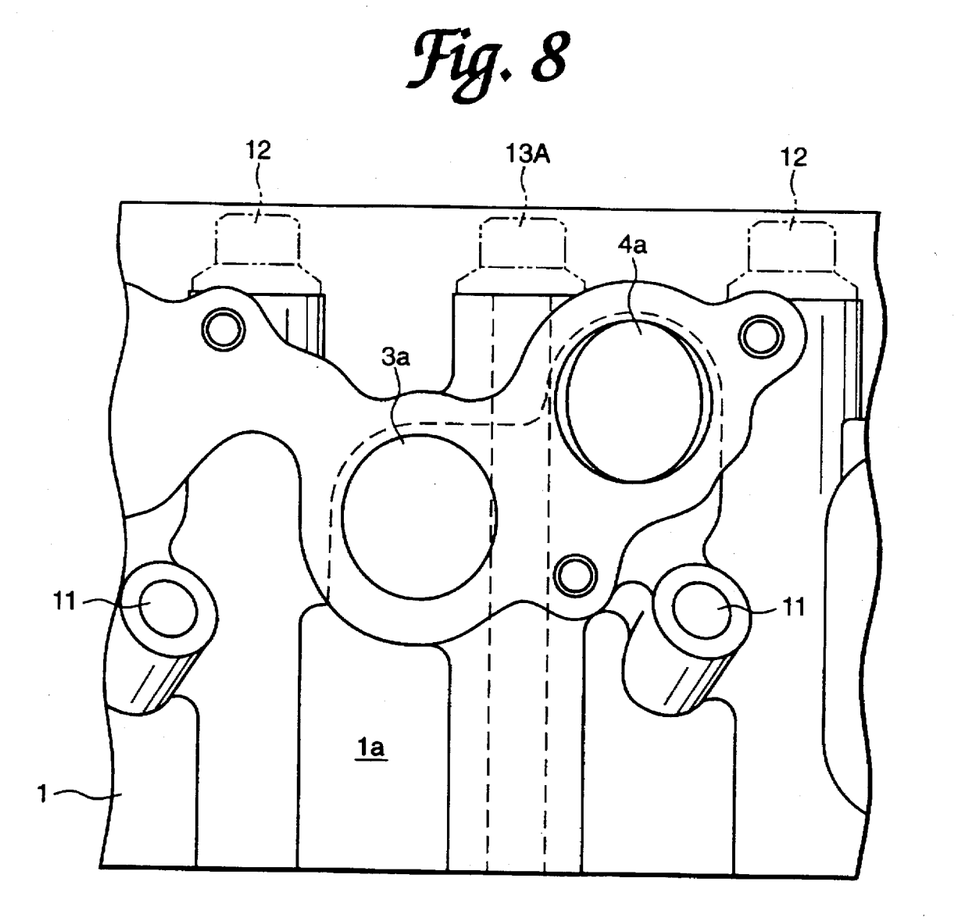
FIG. 8 is a side view of the part of the cylinder head of FIG. 7.

As shown in FIG. 7, the cylinder head 1 is provided with two intake valves 13A and 13B by which the intake ports 3 and 4 of each cylinder 2 are opened and shut at a predetermined timing, respectively. Similarly, the cylinder head 1 is provided with two exhaust valves 14A and 14B by which the exhaust ports 5 and 6 are opened and shut at a predetermined timing, respectively. These valves 13A, 13B, 14A and 14B are driven by a single overhead camshaft type of valve drive system. This valve drive system includes a camshaft 15, disposed above the cylinder head 1, and rocker arms 18 and 19 for the intake valves 13A and 13B and the exhaust valves 14A and 14B, respectively. The camshaft 15 is integrally formed with an intake valve cam 16 for the intake valves 13A and 13B of each cylinder 2 and an exhaust valve cam 17 for the exhaust valves 14A and 14B of the cylinder. Each pair of intake valves 13A and 13B for each cylinder 2 is mechanically connected by a cross head 20, respectively. Similarly, each pair of exhaust valves 14A and 14B for each cylinder 2 is mechanically connected by a cross head 21, respectively. The camshaft 15 opens and closes coincidentally the intake valves 13A and 13B of each cylinder 2 at a predetermined timing. Similarly, the camshaft opens and closes coincidentally the exhaust valves 14A and 14B of each cylinder 2 at a predetermined timing.

The direct injection diesel engine has the glow plug 9 directed, obliquely relative to a vertical direction, from the side of the cylinder head 1 remote from the exhaust port 7, i.e. where the intake ports 3 and 4 open, toward a location between the rear tangential intake port 4 and the front exhaust port 5. The glow plug 9 does not suffer heat damage and has no influence on a flow of coolant in a water jacket (not shown) at the side of the cylinder head 1 to which the exhaust port 7 extends. The glow plug also does not impede, even partly, flows of intake air introduced through the intake ports 3 and 4. Consequently, the engine produces a swirling with certainty and, also, provides an increased cooling efficiency and an improvement in reliable operation of the glow plug 9. Further, because the glow plug 9 extends below the rear intake port 4 and the arrangement does not need to leave a large space for the intake ports 3 and 4 and the glow plug 9, a compact configuration of the engine results. In addition, incorporating the oblique arrangement of the glow plug 9 in a double tangential, direct injection, diesel engine improves space efficiency and volumetric efficiency of the cylinder head 1 and enhances a strong swirling produced in the combustion chamber 2a of the cylinder 1. The arrangement of the rear intake port 4 at an ejection angle larger than that of the front intake port 3, moreover, improves volumetric efficiency of the cylinder head 1 and has an enhanced effect on swirling produced in the combustion chamber 2a of the cylinder 1.

It is to be understood that the cylinder head 1 may be formed with a front intake port 3 configured in a helical fashion and that the intake and exhaust ports may be arranged in a parallel fashion so that both the center lines C3 of the two openings of the intake ports and the center lines C4 of the two openings of the exhaust ports are parallel to the transverse center line C2 of the cylinder 2. Furthermore, the direct injection diesel engine, according to the present invention, may be of a type having more than two intake ports for each cylinder and at least one exhaust port.

It is also to be understood that although the present invention has been described with regard to preferred embodiments thereof, various other embodiments and variants may occur to those skilled in the art. Any such embodiments and variants which are within the scope and spirit of the invention are intended to be covered by the following claims.

What is claimed is:

1. In a direct injection type of diesel engine having a cylinder head which is formed, for each cylinder, with a plurality of intake ports, extending downward from one side of the cylinder head and opening into a combustion chamber on one side of a transverse center line of the cylinder spatially intersecting perpendicularly a center line of rotation of a crankshaft, and at least one exhaust port, extending from another side of the cylinder head and opening into the combustion chamber on another side of the transverse center line, and which is provided, for each cylinder, with a glow plug directed toward a concavity of a piston head, the improvement comprising:

at least one of said intake ports having an approximately straight throat which extends, in a plane perpendicular to a vertical center line of the cylinder, parallel to a tangent to the cylinder and opens into said combustion chamber at upper reaches of swirling produced in said combustion chamber;

another one of said intake ports having a throat which opens into said combustion chamber at lower reaches of said swirling; and said glow plug extends downward from said one side of said cylinder head toward a location between said other one of said intake ports and said at least one exhaust port.

2. An improvement as defined in claim 1, wherein one end of said other one of said intake ports, at which said other one of said intake ports opens into said combustion chamber, is located in closer proximity to said transverse center line than one end of said at least one of said intake ports at which said at least one of said intake ports opens into said combustion chamber.

3. An improvement as defined in claim 2, wherein said glow plug extends so that an extension line of said glow plug intersects said transverse center line at a certain angle.

4. An improvement as defined in claim 2, wherein said glow plug extends below and overlaps at least partly with said other one of said intake ports.

5. An improvement as defined in claim 2, wherein another end of said other one of said intake ports is located higher, in vertical position, than another end of said at least one of said intake ports.

6. An improvement as defined in claim 5, wherein one end of said glow plug, at said one side of said cylinder head, is located higher in position than said other end of said at least one of said intake ports.

7. An improvement as defined in claim 2, wherein said throat of said other one of said intake ports is approximately straight and extends in a plane perpendicular to said vertical center line of the cylinder and parallel to a tangent to the cylinder.

8. An improvement as defined in claim 7, wherein another end of said other one of said intake ports is located higher, in vertical position, than another end of said at least one of said intake ports and has an ejection angle at which air is ejected into said combustion chamber which is larger than that of said at least one of said intake ports.

9. An improvement as defined in claim 8, wherein said glow plug extends below and overlaps at least partly with said other one of said intake ports.

10. In a direct injection type of diesel engine having a cylinder head which is formed, for one cylinder, with a plurality of intake ports opening into a combustion chamber and at least one exhaust port opening into the combustion chamber, and which is provided, for one cylinder, with a glow plug, the improvement comprising:

at least one of said intake ports being positioned on an upstream side of at least one other of said intake ports and with respect to a direction of air swirl in the combustion chamber and formed as a tangential type intake port so as to introduce air into the combustion chamber in a direction parallel with a tangent to the cylinder; and said glow plug being disposed such that one end of said glow plug projects in the combustion chamber and is positioned between one end of the tangential type intake port opening into the combustion chamber and one end of said exhaust port opening into said combustion chamber.

11. In a direct injection type of diesel engine as defined in claim 10, the improvement further comprising the cylinder head being formed, for one cylinder, with two intake ports, each of said intake ports being positioned on an upstream side with respect to a direction of air swirl in the combustion chamber and being formed as a tangential type of intake port so as to introduce air into the combustion chamber in a direction parallel with a tangent to the cylinder.

12. In a direct injection type of diesel engine as defined in claim 10, the improvement further comprising said glow plug extending below and overlapping partly with said tangential type intake port as viewed from above the diesel engine.

13. In a direct injection type of diesel engine as defined in claim 10, the improvement further comprising said at least one of said intake ports and said exhaust port being positioned on opposite sides of a transverse center line of the cylinder, respectively.

14. In a direct injection type of diesel engine having a cylinder head which is formed, for one cylinder, with a plurality of intake ports and at least one exhaust port opening into a combustion chamber, and which is provided, for one cylinder, with a glow plug, the improvement comprising:

said intake ports having first ends which open at a same level at one side of the cylinder and extending downward from said one side of the cylinder and opening into the combustion chamber;

at least one of said intake ports, which has a tangential throat, and said exhaust port being positioned on opposite sides of a transverse center line of the cylinder; and said glow plug extending from between top and side walls of the cylinder head toward a location between said at least one of said intake ports and said exhaust port.

15. In a direct injection type of diesel engine as defined in claim 14, the improvement further comprising said glow plug extending below and overlapping partly with said at least one of said intake ports as viewed from above the diesel engine.

* * * * *